United States Patent [19]

Kumar

[11] Patent Number: 4,950,016
[45] Date of Patent: Aug. 21, 1990

[54] INTEGRATED PNEUMATIC VALVE/SENSOR ASSEMBLY FOR VACUUM SUPPLY APPARATUS

[75] Inventor: Viraraghavan S. Kumar, Palm Bay, Fla.

[73] Assignee: Teknocraft, Inc., Palm Bay, Fla.

[21] Appl. No.: 342,340

[22] Filed: Apr. 24, 1989

[51] Int. Cl.$^5$ ............................. B66C 1/02; F04F 5/48
[52] U.S. Cl. ..................................... 294/64.2; 417/187
[58] Field of Search ............... 294/64.2; 417/182, 187, 417/189; 137/512, 512.1, 512.2, 513; 901/40; 251/24, 30.03

[56]    References Cited

U.S. PATENT DOCUMENTS

| | | | |
|---|---|---|---|
| 4,056,334 | 11/1977 | Fortune | 417/189 |
| 4,073,602 | 2/1978 | Cagle | 294/64.2 X |
| 4,432,701 | 2/1984 | Ise | 294/64.2 X |
| 4,655,692 | 4/1987 | Ise | 294/64.2 X |
| 4,750,768 | 6/1988 | Kumar | 294/64.1 |

*Primary Examiner*—Margaret A. Focarino
*Assistant Examiner*—Dean J. Kramer
*Attorney, Agent, or Firm*—Evenson, Wands, Edwards, Lenahan & McKeown

[57] ABSTRACT

A pneumatic vacuum gripping assembly for attachment to a suction gripper device is coupled by way of a fluid flow link to a venturi for controlling the vacuum of the suction gripper device comprises an integrated housing assembly having a venturi and a pneumatic fluid-flow control valve unit. The valve unit controllably interrupts fluid communication between a main supply inlet port and the venturi and is controlled by the output of a pressure sensor that is integrated within the housing assembly. The assembly further includes a reset valve arranged in a compact, stack configuration with the other components of the valve unit and ported to the venturi vacuum line for controllably 'blowing off' the suction gripper device from a gripped object.

16 Claims, 3 Drawing Sheets

INTEGRATED PNEUMATIC VALVE/SENSOR ASSEMBLY FOR VACUUM SUPPLY APPARATUS

FIELD OF THE INVENTION

The present invention relates, in general, to pneumatic fluid-flow control systems, and is particularly directed to a fluid-flow control assembly in which a pneumatic fluid-flow control valve and an associated control sensor are integrated in a compact, self-contained unit, that facilitates interfacing the control assembly with a modular venturi device.

BACKGROUND OF THE INVENTION

Precision industrial fluid-flow control mechanisms, such as pneumatic gripping devices, typically employ some form of pneumatic (or electropneumatic) valve for controlling the flow of a working fluid (e.g. air in a vacuum system) to a controlled pressure region, such as a venturi associated with a vacuum pick-up head of a seizure/transport tool. One example of such a mechanism is the pneumatic vacuum gripper system described in my U.S. Pat. No. 4,750,768 issued June 14, 1988. In accordance with the structure and operation of the patented system, fluid-flow through a main venturi vacuum generator is selectively controlled, in order to ensure the application of a vacuum to a pick-up head as necessary to seize and grip an object.

In conventional industrial applications, the various units that make up an overall system are customarily stand alone devices interconnected using numerous 'plumbing' conduits and fixtures to realize an overall system functionality. While the availability of different types of parts from a variety of sources offers the system designer a wide choice of system configuration, the production of customized interface components is often required, which keeps costs high and often results in an implementation that suffers from weight and space penalties, thereby restricting multiple application usage.

To obviate these shortcomings of conventional 'patch work'-configured pneumatic vacuum gripping systems, I have invented a new and improved electropneumatic device in which a vacuum head venturi and an associated electropneumatic fluid-flow control valve are integrated together in a compact modular assembly that readily lends itself to a variety of gripping and transport applications, without imposing space/weight constraints on the host industrial system. This inventive device, which is the subject matter of my copending U.S. patent application Ser. No. 342,305, entitled "Electropneumatic Vacuum Supply Assembly", filed on even date herewith, is formed of a multiport modular unit, to which fluid supply, exhaust and vacuum lines may be coupled, for providing an electropneumatically-controlled vacuum to an attendant gripping head.

In particular, the device is configured as an integrated assembly that houses both a venturi and solenoid-operated fluid-flow control valve unit. The valve unit contains a solenoid device, which is coupled with a translatable spool valve element, for controlling the displacement of the valve element and thereby fluid communication between fluid inlet and fluid outlet ports through the venturi. Miniaturization and simplicity of the unit is facilitated by the design of the solenoid unit which employs a steel bearing ball as its movable armature. Namely, by paying special attention to the structural configuration and cooperation among the hardware components of the system, I have been able to implement all of its functionality in an integrated arrangement that readily lends itself to multiple utility applications and permits the units to be easily interfaced with a variety of existing fluid flow control system designs.

SUMMARY OF THE INVENTION

In accordance with the present invention I have developed additional enhancements in the hardware configuration of fluid-flow control arrangements for vacuum gripping systems that enjoy the compact modularity and interface capability attributes of my improved electropneumatic valve assembly described above. In particular, I have applied my miniaturized, integrated approach to a pneumatic fluid-flow control system for controlling the application and release of vacuum supplied by a venturi vacuum head to a suction gripping device.

Pursuant to a first embodiment, the present invention provides a compact structural arrangement for integrating both sensor and control valve elements, such as may be employed in the 'sense and grip' system described in my above-referenced Patent, in self-contained, miniaturized configuration that may be readily physically incorporated with a variety of industrial vacuum gripping mechanisms. This first embodiment has particular utility as a fluid-flow control valve assembly for controlling the operation of a pneumatic vacuum gripping system having a suction gripper device that is arranged for suction engagement with an object and is coupled by way of a fluid flow link to a venturi for controlling the vacuum of said suction gripper device. To this end the assembly comprises a housing having a first, main fluid-flow chamber, a second, pilot chamber, which is vented to the atmosphere and a third, sensor support chamber. A first (intlet) fluid communication port is coupled to a first portion of the first chamber, a second (outlet) fluid communication port is coupled to a second portion of the first chamber and a third (control) fluid communication port is coupled between a third portion of the first chamber and a first portion of the second chamber.

The housing further contains a first movable (spool) valve disposed within the first chamber having an internal fluid passageway for providing a fluid communication path between the first fluid communication port and the third portion of the first chamber. The valve is movable between first and second positions within the first chamber, such that, at its first position, the spool valve provides a fluid communication path between the first and second portions of the first chamber and thereby provides fluid communication between the inlet and outlet ports. At its second position, the spool valve interrupts the fluid communication path between the first and second portions of the first chamber and thereby prevents fluid communication between the inlet and outlet ports.

A second movable valve element, in the form of a flexible diaphragm, is supported within the pilot chamber in juxtaposition with the control port, for controllably restricting fluid flow through the control port and thereby controlling differential pressure across a support diaphragm to which the spool valve is attached. Flexing of this diaphragm is controlled by the pressure output of a sensor that is retained in the third, sensor support chamber, located immediately above the pilot chamber. A pneumatic power supply line for the sensor is provided by way of a fluid communication passageway formed within the body of the housing from the sensor chamber to the first portion of the first chamber (to which the inlet port is coupled). An output fluid passageway from the sensor to the control diaphragm is also formed within the body of the housing between the sensor support chamber and a pressure application chamber above the diaphragm in the pilot chamber.

The sensor, which also has a fluid pressure sensor port to which a sense line from the venturi is coupled, produces a controlled output pressure in response to a pressure stimulus at its sensor port, the controlled output pressure being coupled through the output passageway to the pressure application chamber, so as to control the position of the diaphragm within the pilot chamber and thereby the restriction of fluid flow through the third communication port. When the sensor senses a positive pressure and causes the diaphragm to be flexed downwardly, so as to restrict fluid flow through the third port, there is a pressure build-up above the support diaphragm for the spool valve, creating a force differential across the spool valve. As a result, the spool valve is translated downwardly to its first position, so that a fluid flow communication path from a main pneumatic supply line is established between the fluid inlet and outlet ports of the assembly to the venturi.

In response to a negative pressure stimulus (from the venturi vacuum line) applied to its sensor port, the sensor reduces its output pressure, whereby the diaphragm is flexed back away from the third port and thereby allows fluid communication through the third port through the pilot chamber to the atmosphere. This action removes the downward acting force differential across spool valve, so that the spool valve is translated back to its second position, thereby interrupting the fluid flow communication path between the inlet and outlet ports, thus cutting off the main supply to the venturi.

In accordance with a second embodiment, the fluid-flow control assembly of the present invention further includes a fourth, reset valve retention chamber, located immediately above the sensor support chamber. Fourth and fifth fluid communication ports are coupled to the fourth chamber, for connection to the venturi vacuum line and to an external reset control pressure supply, respectively. A sensor stimulus fluid communication passageway is formed within the housing between the fourth chamber and the sensor chamber for pneumatic communication engagement with the sensor port of the sensor. A third (reset) valve, in the form of a flexible diaphragm, is supported in the fourth chamber to controllably restrict fluid flow between the fourth communication port and the fourth chamber. A breather vent is formed in the housing to couple the side of the diaphragm, opposite to the side facing the fourth and fifth ports and the sensor stimulus passageway, to the atmosphere. In the course of the establishment of a vacuum, the connection between the external reset control supply and the fifth port is interrupted. The diaphragm in the fourth chamber is spaced apart from a valve seat to which the fourth port is coupled, so as to provide fluid communication between the venturi vacuum line, through the fourth chamber to the sensor stimulus port.

When a vacuum has been established, the venturi vacuum line provides a negative pressure to the fourth port, which creates a differential pressure (and consequential force) acting on opposite sides of the diaphragm, causing the diaphragm to flex into engagement with the seat of the reset valve and thereby effectively interrupting fluid communication between the fourth communication port and the fourth chamber. With both the fourth and fifth ports closed the sensor stimulus passageway provides a negative pressure to the sensor, so as to control of the operation of the control diaphragm and spool valve as in the first embodiment.

When the vacuum is to be released, a positive input pressure is applied through the fifth communication port into the fourth chamber. This positive pressure causes several things to happen. First, because the sensor stimulus port is coupled to the fourth chamber, the positive pressure is coupled to the sensor as a control input to interrupt the input to the venturi and terminate the vacuum. The positive pressure also displaces the second diaphragm away from its valve seat, so that the fourth port to the vacuum line is now open. The positive pressure is coupled by way of the fourth port through the vacuum line to the suction gripper device, and causes the gripper device to be 'blown'-off the object.

DETAILED DESCRIPTION:

As pointed out previously, the present invention provides a compact, integrated hardware configuration of the components of a vacuum gripper device of the type detailed in my above-referenced '768 Patent, the disclosure of which is incorporated herein by reference, and attention may be directed to that Patent for particulars of the makeup and overall functionality of the system. In the explanation to follow, the manner in which components of that system and an improved modification of the system are assembled together in accordance with respective embodiments of the present invention, to provide a modular structure for facilitating vacuum control in a variety of vacuum supply architectures, will be detailed.

Figure 1:
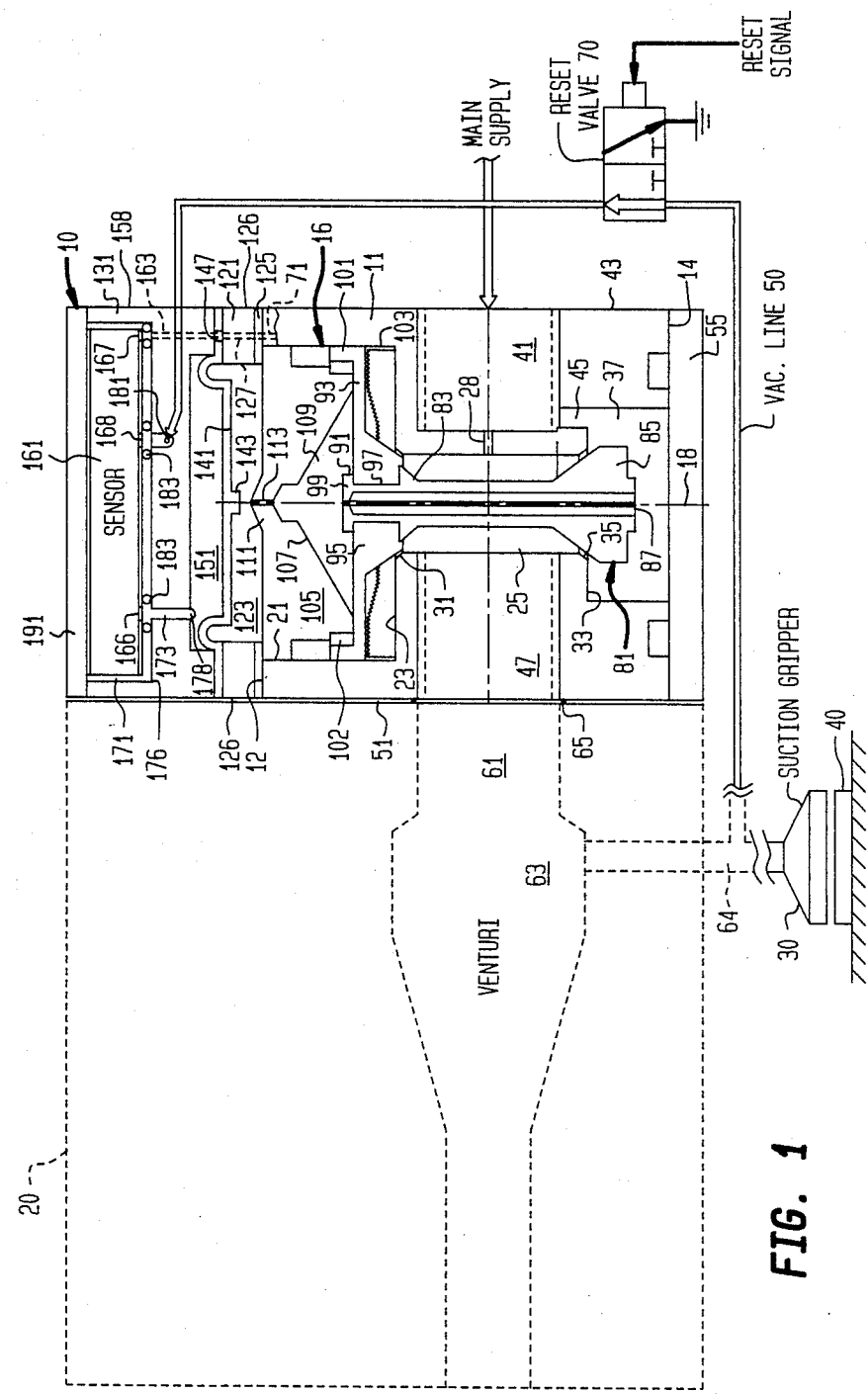
FIGS. 1 and 2 are respective diagrammatic side and partial end views of a first embodiment of the fluid-flow control valve assembly in accordance with the present invention.
Figure 2:
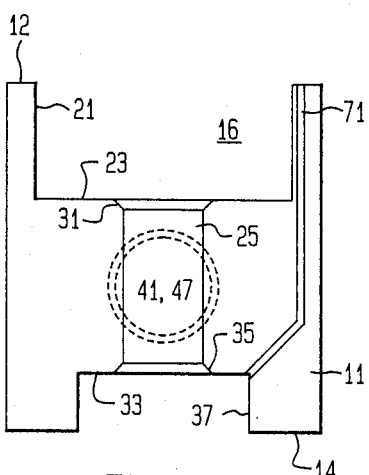

Referring to FIGS. 1 and 2, there are shown respective diagrammatic side and partial end views of a first embodiment of the fluid-flow control valve assembly in accordance with the present invention, which is configured so that it may be readily attached with either modular, self-contained vacuum supply mechanisms, or larger multi-unit arrangements, for controlling the operation of a pneumatic vacuum gripping system having a suction gripper device arranged for suction engagement with an object. FIGS. 1 and 2, the assembly is shown as comprising a generally solid rectangular, or block-shaped, housing 10. By virtue of this block shape, the valve may be readily integrated (abutted flush) with a similarly (block-) shaped venturi housing 20, shown in broken lines. The vacuum port of the venturi is coupled to a suction gripper device 30 for engagement with an object 40, through a vacuum output line 50.

Housing 10 is comprised of a first solid rectangular housing block 11 having a top surface 12 and a bottom surface 14. Internally, housing block 11 has a first, stepped cylindrical chamber 16 which extends through the housing block from top surface 12 to bottom surface 14 along longitudinal cylinder axis 18. A first portion 21 of chamber 16 extends from top surface 12 to a wide annular floor region 23. A cylindrical bore 25 extends from a chamfered region 31 at the interior portion of floor region 23 to an annular land region 33. Annular land region 33 has a chamfered region 35, from which a lower portion 37 of chamber 16 extends to disc-shaped region adjacent to bottom surface 14.

A first, threaded cylindrical fluid inlet bore 41, which serves as the fluid inlet port for the valve assembly, extends from a side surface 43 of housing block 11 to a coupling hole 45 that extends to lower portion 37 of chamber 16, so as to provide permanent fluid communication between inlet bore 41 and the lower portion of chamber 16. Similarly, a second, threaded cylindrical fluid outlet bore 47, which serves as the fluid outlet port for the valve assembly, extends from side surface 51 of housing block 11 to intersect and open into cylindrical chamber 16. Fluid outlet bore 47 is preferably arranged to be coaxial with a venturi inlet bore 61 of a venturi chamber 63 within venturi housing 20. A small diameter pilot hole 28 is drilled through the end wall of inlet bore 41 to chamber 16, to allow the continuous flow of a reduced or pilot pressure from the main supply line to the venturi, regardless of the operation of the control valve.

A first, slanted L-shaped fluid passageway 71 (FIG. 2) extends through housing block 11 from lower portion 37 of chamber 16 to top surface 12. As will be explained in detail below, passageway 71 serves to provide a pressure supply line to a sensor chamber that contains a sensor device that controls the operation of the valve assembly.

Supported within and axially translatable within bore 25 is a spool valve 81. Tapered end portions 83 and 85 of spool valve 81 are sized and shaped to snugly engage the upper and lower chamfered regions 31 and 35 at the opposite ends of bore 25, when the spool valve is vertically displaced (up or down) in the bore. The length of spool valve 81 is slightly longer than the length of bore 25, so that, when one of the upper and lower tapered end portions 83 and 85 of the spool valve abuts against one of chamfered regions 31 and 35, there is a gap or opening around the spool valve and chamfered region at the opposite end of bore 25. A narrow diameter axial bore 87 extends the length of spool valve 81 to provide fluid communication between lowermost chamber portion 37 and chamber portion 21.

The top end 91 of spool valve 81 is mounted to a flexible diaphragm 93, an interior hub portion 95 of which is captured between a neck region 97 and a cap region 99 of the spool valve. Along the outer perimeter of diaphragm 93 is a rim region 101 which fits within bore portion 21 and rests upon a cylindrical spacer 103. Spacer 103 is inserted through the top of chamber 16 and abuts against annular land region 23. An annular ring 102 fits within rim region 101 and serves to secure diaphragm 93 in place against portion 21 of chamber 16. Resting on the outer region of diaphragm 93 is a generally cylindrical, inverted-V shaped stem element 105 having a concave V surface portion 107 that forms an interior cavity or space 109 above diaphragm 93, and a snout portion 111 which extends from the concave surface portion 107 and protrudes slightly above the plane of top surface 12 of housing block 11. Coaxial with axis 18 and extending through the snout portion 111 of stem element 105 is a hollow cylindrical bore 113 which serves as the control port for translating of spool valve 81. Stem element 105 has an outer diameter that is sized to snuggly fit within portion 21 of chamber 16.

Flush-mounted with the top surface 12 of housing block 11 is a spacer plate 121, which has a cylindrical aperture 123 therethrough that surrounds snout portion 111 of stem element 105. Aperture 123 serves as a pilot chamber through which air flows from bore 113 to one or more breather vents 125 that extend from aperture 123 to the outer side surface 126 of spacer plate 121, so that air flow may be vented to the atmosphere. A coupling fluid communication passageway 127, coincident with passageway 71, extends through spacer plate 121, for providing a feed-through to an upper housing block 131. The diameter of passageway 127 is tailored (reduced) to provide the necessary power supply pressure for operating a sensor device that is retained in housing block 131.

Captured between the top surface 127 of spacer plate 121 and the bottom surface 133 of housing block 131 is a flexible diaphragm 141 having a central disc portion 143 that is sized to cover bore 113 when diaphragm 141 is flexed downwardly into engagement with the top surface of stem 105. For this purpose, the bottom surface 133 of upper housing block 131 has a shallow cylindrical depression 151 facing the upper surface of diaphragm 141 that serves to provide a pressure application chamber for imparting a positive pressure, supplied by a sensor to be described below, to the top surface of the diaphragm, and thereby causing diaphragm 141 to flex toward stem 105, in order that disc portion 143 may engage bore 113. Namely, diaphragm 141 forms a movable valve element arranged in juxtaposition with bore 113, for controllably restricting fluid flow through bore 113 and thereby controlling differential pressure exerted across diaphragm 93, for establishing the position of spool valve 81.

Flexing of diaphragm 141 is controlled by the pressure output of a sensor 161 that is retained in a third, sensor support chamber 171 located immediately above depression 151 in upper housing block 131. A pneumatic power supply line for sensor 161 is provided by way of a fluid communication passageway 163 formed within upper housing block 131 between sensor chamber 171 and an aperture 147 in diaphragm 141 that is coincident with passageway 127 through spacer plate 121, so that a continuous fluid passageway is provided within housing 11 between fluid inlet port 41 and sensor chamber 171. An L-shaped output fluid passageway 173 extends through upper housing block 131 from floor 176 of sensor chamber 171 to a an exit port 178 at the cylindrical sidewall of pressure application chamber 151 above diaphragm 141. A sensor port 181 for sensor 161 is formed within upper housing block 131 by means of an additional L-shaped fluid passageway extending from floor 176 of sensor chamber 171 to the exterior sidewall 158 of upper housing block 131, whereat a suitable fluid line fitting is provided for coupling the sensor port to the vacuum line of the venturi. The locations whereat fluid passageways 173, 151 and 181 through upper housing block 131 intersect floor 176 of sensor chamber 171 are aligned with associated output port 166, power supply port 167 and sensor port 168 of sensor 161. Respective O-rings 183 are inserted between the bottom surface of sensor 161 and the floor 176 of sensor support chamber 171 to ensure a fluid-tight engagement between the sensor ports and the fluid passageways to which the sensor is coupled. A cover 191 is affixed to the top of upper housing block 131 to securely retain sensor 161 within chamber 171.

When coupled with a block-shaped venturi housing, such as block 20, the fluid-flow control valve assembly may be mated directly against the block (via a suitable O-ring coupling 65), so that outlet port 47 abuts in sealed engagement with the venturi inlet, as diagrammatically illustrated in FIG. 1. Alternatively, the assembly may be coupled to the vacuum head by way of a threaded fitting at outlet port 47. The main pneumatic supply line is coupled to inlet port 41, while the output line from the venturi, to which the gripper device is coupled, is coupled, as by way of a suitable T-fitting, to sensor port 181.

The valve assembly operates as follows. When sensor 161 is not producing a positive output pressure at its output port 166, an upward fluid stream, originating via fluid inlet bore 41 and passing through axial bore 87 in spool valve, exits bore 113 in stem 105 and travels through pilot chamber 123, through breather vent 125 to the atmosphere. As a consequence, the fluid pressure on the top side of diaphragm 93 is relatively low so that the resulting force exterted on the top side of diaphragm 93 is also low and insufficient to overcome the upward force that keeps spool valve 81 in snug contact with chamfered portion 35 of bore 25, so that fluid communication between fluid inlet port 41 and fluid outlet port 47 is interrupted.

When suction gripper 30 comes in contact with object 40, a slight negative pressure is set-up in venturi output line 64 and the connection line 50 between the venturi output and sensor port 168. This negative signal is sensed by sensor 161 and the output state of the sensor at port 166 changes from "off" to "on". This causes pressure to build-up in chamber 151 which causes diaphragm 141 to flex downward within pilot chamber 123, so as to restrict flow through bore 113. As a result, the pressure in chamber 109 above diaphragm 93 increases, so as to flex diaphragm 93 downward and thereby push spool valve 81 downward, whereby its lower tapered end portion 85 separates from chamfered surface 35 of bore 25. Consequently, a fluid flow commmunication path is established between inlet port 41 and outlet port 47, so that the main supply line pressure is applied to venturi 63, in order that a high level vacuum may be established in its vacuum output line to suction gripping device 30.

The device can be turned off by having a reset valve 70 in line 50 (as described in my previous U.S. Pat. No. 4,750,768). This valve will connect the sensor control port 168 to the atmosphere and block line 50 at the same time when a reset signal is applied. This action will cause the sensor output pressure at port 166 to go into the "off" state, so as to cause diaphragm 141 to flex upwardly, away from bore 113, and thereby open the flow through bore 113 to vent, to the atmosphere, through chamber 123 and vent hole 125. This cause the pressure to fall in chamber 109, which causes diaphragm 93 to flex upwardly. As a result, spool valve 81 is translated upwardly whereby tapered end portion 85 once again engages bore 25 and interrupts the fluid flow communication path between inlet port 41 and outlet port 47. Thus, the main flow through the venturi 63 is shut off, which causes the high vacuum to go "off". Object 40 is released from suction gripper 30 by gravity. In order to initiate the cycle again, reset valve 70 has to be reverted back to its original state, which connects vacuum outlet port 64 to sensor port 168 through line 50.

By means of a pilot hole 28 between inlet port 41 and bore 25 within housing block 11, there is always a small pilot flow through outlet port 47 to venturi 63, so that the venturi attempts to maintain a slight vacuum in output line 64. The energy in the pneumatic pressure flow from the main supply through the valve assembly and the venturi to maintain such a reduced or nominal level of vacuum is considerably less than that required during full pressure application when a full vacuum is initiated to enable the suction gripper device 30 to seize an object 40. However, if suction gripper 30 is not in contact with object 40, this vacuum does not build up and hence the sensor control port 168 does not see any negative pressure through sensor line 50.

Figure 4:
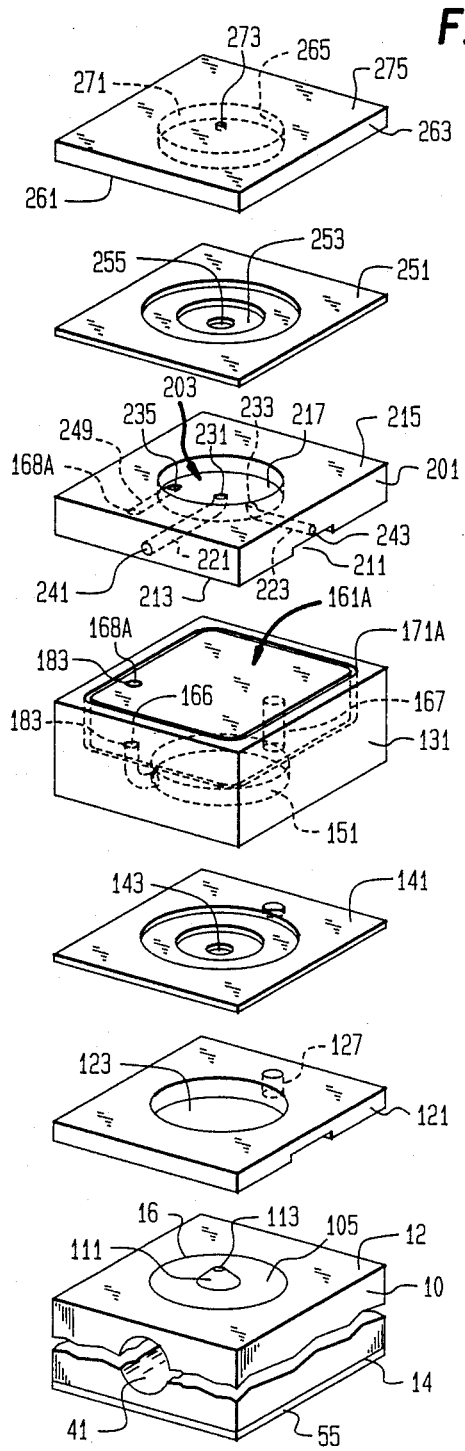
FIGS. 3 and 4 are respective diagrammatic side and exploded pictorial views of a second embodiment of the invention.
Figure 3:
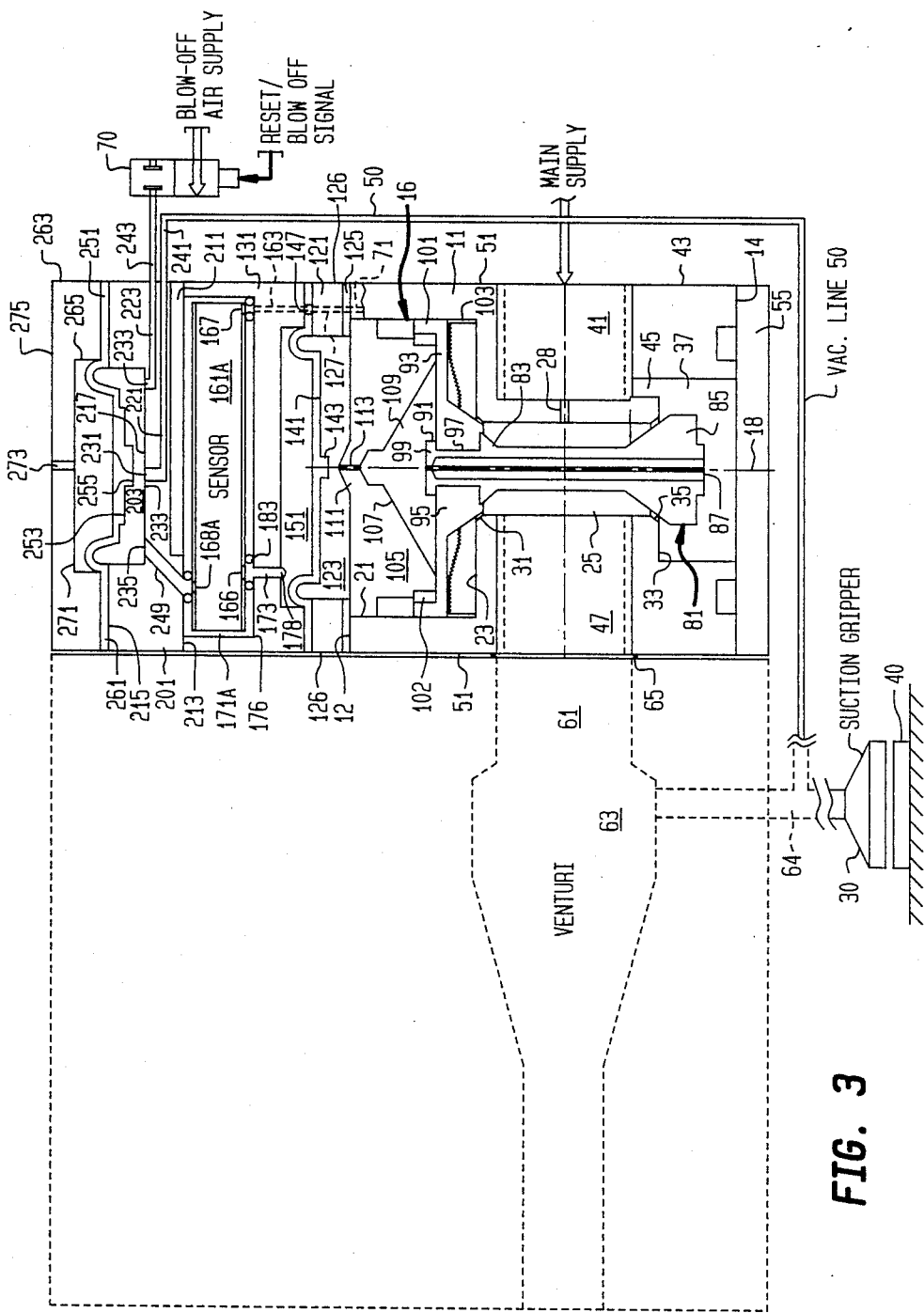

In accordance with a second embodiment of the invention, diagrammatically illustrated in the side view of FIG. 3 and the exploded pictorial view of FIG. 4, in place of cover 191 closing the top of sensor chamber 171 in upper housing block 131, the assembly further includes a top housing block 201 having a fourth, reset valve retention chamber 203, mounted atop housing 131 in which sensor chamber 171 is formed. Top housing block 201 includes a breather depression 211 formed in its bottom surface 213, facing sensor support chamber 171 in housing block 131. Reset valve retention chamber 203 is defined by a shallow cylindrical or disk-shaped depression extending from the top surface 215 to a circular floor 217. A pair of L-shaped fluid communication passageways 221, 223 intersect spaced apart locations 231, 233 in the floor 217 of chamber 203 and extend to side ports 241, 243 at exterior sidewalls of housing block 201, for connection to venturi vacuum line 50 and to an external reset control pressure supply, respectively. A sensor stimulus fluid communication passageway 249 is formed within top housing block 201 between location 235 at the floor 217 of chamber 203 and the location of sensor port 168A at the top of a modified sensor 161A, disposed in a modified sensor chamber 171A for pneumatic communication engagement with the sensor port 168 of sensor 161A. Namely, in the second embodiment, the sensor control port 168A, rather than being at the same bottom surface as the output and power supply ports as in the first embodiment, is located on the top surface of the sensor. Consequently, housing block 131 contains no passageway 181 to the exterior sidewall.

A third (reset) valve, in the form of a flexible diaphragm 251, is captured between the top surface 215 of top housing block 201 and the bottom surface 261 of a top cover plate 263. Top cover plate 263 has a shallow cylindrical depression 265 that extends from bottom surface 261 to a circular floor 271. A breather bore 273 is drilled from the top surface 275 of cover plate 263 to depression 263, so as to vent depression 271 to the atmosphere. A central circular portion 253 of diaphragm has a central disc portion 255 that is juxtaposed with opening 231 in the floor 217 of chamber 203 in housing block 201.

In operation, as in first embodiment, a small pilot flow tries to maintain a low level vacuum in venturi output line 64 and vacuum sensor line 50. However, if gripper 30 does not contact object 40, no vacuum can build up. When suction gripper 30 comes in contact with object 40, a low level vacuum is established in venturi output line 64 and vacuum sensor line 50. This is sensed by sensor 161A through line 50, port 241, through chamber 203, through passageway 249 into port 168A. This causes sensor output 166 to turn "on", which causes diaphragm 141 to flex downward and causes the valve to turn "on". This establishes a main venturi flow, so as to establish a high vacuum in venturi line 64, to grip object 40 firmly. This high vacuum level is also established in line 50. Diaphragm 251 is thus subjected to a differential pressure, namely atmospheric pressure in chamber 271 through breather hole 273 and vacuum at port 241. This causes diaphragm 251 to flex downward and the projection 255 shuts off opening 231 to isolate chamber 203 from the main venturi. Hence, the sensor port 168A is blocked, since chamber 203 is not ported to any outside pressures. (Port 233, which is connected to port 243, is blocked by reset valve 70. In the absence of reset/blow-off signal). Sensor 161A maintains output 166 in "on" state. Under these conditions, when object 40 is to be released, a release/blow-off signal is applied to the reset valve 70, which connects port 243 to blow-off air. As a consequence, chamber 203 line 249 and port 168A see a positive pressure. This turns the output of sensor 161A "off", which turns the main venturi off. Simultaneously, a reversal of pressure differential is applied to diaphragm 251 high pressure in chamber 203 and atmospheric pressure in chamber 271. This causes diaphragm 251 to be translated upwardly and allows positive blow-off pressure to be ported through port 241 and line 221 into line 50 and into gripper device 30. This blows-off object 40 positively for fast release. When the reset signal is turned off, the system returns to its original cycle start condition.

As will be appreciated from the following description, through improvements in the hardware configuration of a pneumatic fluid-flow control assembly and control elements therefor, I have made it possible to compactly arrange and interface substantially all the components that are employed within a pneumatic fluid-flow control system for controlling the application and release of vacuum supplied by a venturi vacuum head to a suction gripping device. This improved miniaturization greatly lends itself to modularization of a variety of pneumatic control systems without the need for extensive amounts of 'plumbing', that are not only cumbersome but are exposed to accidental contact and potential severing.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

WHAT IS CLAIMED IS:

1. A fluid-flow control valve assembly for controlling the operation of a pneumatic vacuum gripping system having a suction gripper device that is arranged for suction engagement with an object and is coupled by way of a fluid flow link to a venturi for controlling the vacuum of said suction gripper device comprising:
   a housing having first, second and third chambers, a first fluid communication port coupled to a first portion of said first chamber, a second fluid communication port coupled to a second portion of said first chamber, and a third fluid communication port coupled between a third portion of said first chamber and a first portion of said second chamber, said housing further containing a first movable valve element disposed within said first chamber between the first and second portions thereof and having a fluid passageway for providing a fluid communication path therethrough between said first fluid communication port and said third portion of said first chamber, and being movable between first and second positions within said first chamber, such that, at its first position, said first movable valve element provides a fluid communication path between said first and second portions of said first chamber and thereby provides fluid communication between said first and second fluid communication ports, and at its second position, said first movable valve element interrupts the fluid communication path between said first and second portions of said first chamber and thereby prevents fluid communication between said first and second fluid communication ports, a second movable valve element supported within said second chamber for controllably restricting fluid flow through said third communication port, a first fluid communication passageway formed in said housing between said second chamber and a first location within said third chamber, and a second fluid communication passageway formed in said housing between said first portion of said first chamber and a second location within said third chamber;
   fluid-flow sensor means, provided in said third chamber, having a fluid pressure supply port coupled to said second fluid communication passageway at said second location within said third chamber, a fluid pressure output port coupled to said first fluid communication passageway at said first location within said third chamber, and a fluid pressure sensor port, said fluid-flow sensor means providing, at said fluid pressure output port, a controlled pressure in response to a pressure stimulus at said fluid pressure sensor port, said controlled pressure being coupled through said first fluid pressure passageway to said second chamber to control the operation of said second valve element and thereby fluid communication through said third communication port; whereby
   in response to a first pressure stimulus applied to said fluid pressure sensor port, a controlled pressure is coupled through said first fluid pressure passageway to said third chamber to cause said second valve element to restrict fluid communication through said third communication port and thereby cause said first movable valve element to be translated to said first position, so that a fluid flow communication path may be established between said first and second communication ports and, in response to a second pressure stimulus applied to said fluid pressure sensor port, said controlled pressure is reduced, so as to cause said second valve element to allow fluid communication through said third communication port and thereby cause said first movable valve element to be translated to said second position, and interrupt a fluid flow communication path between said first and second communication ports.

2. A fluid-flow control valve assembly according to claim 1, where said housing further comprises a fourth chamber to which fourth and fifth fluid communication ports are coupled and a third fluid communication passageway formed in said housing and extending from a first location of said fourth chamber to a third location of said third chamber whereat the fluid pressure sensor port of said sensor means is located, and a third movable valve element arranged to controllably restrict fluid flow between said fourth communication port and said fourth chamber.

3. A fluid-flow control valve assembly according to claim 2, wherein said third movable valve element comprises a flexible diaphragm supported in said fourth chamber for effectively interrupting fluid communication between said fourth communication port and said fourth chamber in response to a prescribed pressure stimulus at said fourth communication port.

4. A fluid-flow control valve assembly according to claim 3, wherein said housing further includes a fourth fluid communication passageway therethrough coupling said fifth communication port to a second location in said fourth chamber adjacent to the flexible diaphragm of which said third movable valve element is comprised, so that, in response to the application of a positive pressure stimulus to said fifth communication port, and thereby into said fourth chamber, said flexible diaphragm is displaced away from a fluid restricting condition of said fourth fluid communication port, so that said positive pressure stimulus is coupled from said fourth chamber to said fourth communication port.

5. A fluid-flow control valve assembly according to claim 1, wherein said second movable valve element comprises a flexible diaphragm arranged in said second chamber between said first fluid communication passageway adjacent and said third fluid communication port, so as to be flexibly translated toward said third fluid communication port and thereby restrict fluid communication through said third fluid communication port, in response to said controlled pressure being output from said sensor means through said first fluid communication passageway and into said second chamber.

6. A pneumatic vacuum gripping assembly for attachment to a suction gripper device that is arranged for suction engagement with an object and is to be coupled by way of a fluid flow link to a venturi for controlling the vacuum of said suction gripper device comprising an integrated housing assembly having a fluid inlet port, a fluid outlet port and a vacuum port, and containing therein a venturi and a pneumatic fluid-flow control valve unit, said valve unit having a first, fluid-flow chamber in which a first movable valve element is disposed between and in fluid communication with said fluid inlet port and the fluid inlet of the venturi, said venturi having an outlet coupled by way of a fluid outlet passageway to said outlet port and having a vacuum outlet coupled to said vacuum port, said first movable valve element controlling fluid communication between said fluid inlet port and said venturi, and a fluid-flow control valve assembly, containing a pressure sensor and a pneumatic fluid-flow control device controlled by said pressure sensor, coupled with said first movable valve element, for controlling the displacement of said first movable valve element and thereby fluid communication between said fluid inlet port and said fluid outlet port through said venturi, and wherein said pneumatic fluid-flow control valve unit comprises a housing having a first, second and third chambers, said first chamber corresponding to said fluid-flow chamber, a first fluid communication port, corresponding to said fluid inlet port, coupled to a first portion of said first chamber, a second fluid communication port coupled to a second portion of said first chamber and to the fluid inlet of said venturi, and a third fluid communication port coupled between a third portion of said first chamber and a first portion of said second chamber, said first movable valve element being disposed within said first chamber between the first and second portions thereof and having a fluid passageway for providing a fluid communication path therethrough between said first fluid communication port and said third portion of said first chamber, and being movable between first and second positions within said first chamber, such that, at its first position, said first movable valve element provides a fluid communication path between said first and second portions of said first chamber and thereby provides fluid communication between said first and second fluid communication ports, and, at its second position, said first movable valve element interrupts the fluid communication path between said first and second portions of said first chamber and thereby prevents fluid communication between said first and second fluid communication ports, a second movable valve element supported within said second chamber for controllably restricting fluid flow through said third communication port, a first fluid communication passageway formed in said housing between said second chamber and a first location within said third chamber, and a second fluid communication passageway formed in said housing between said first portion of said first chamber and a second location within said third chamber;

said sensor comprising fluid-flow sensor means, provided in said third chamber, having a fluid pressure supply port coupled to said second fluid communication passageway at said second location within said third chamber, a fluid pressure output port coupled to said first fluid communication passageway at said first location within said third chamber, and a fluid pressure sensor port, said fluid-flow sensor means providing, at said fluid pressure output port, a controlled pressure in response to a pressure stimulus at said fluid pressure sensor port, said controlled pressure being coupled through said first fluid pressure passageway to said second chamber to control the operation of said second valve element and thereby fluid communication through said third communication port; whereby in response to a first pressure stimulus applied to said fluid pressure sensor port, a controlled pressure is coupled through said first fluid pressure passageway to said second chamber to cause said second valve element to restrict fluid communication through said third communication port and thereby cause said first movable valve element to be translated to said first position, so that a fluid flow communication path may be established between said first and second communication ports and, in response to a second pressure stimulus applied to said fluid pressure sensor port, said controlled pressure is reduced, so as to cause said second valve element to allow fluid communication through said third communication port and thereby cause said first movable valve element to be translated to said second position, and interrupt a fluid flow communication path between said first and second communication ports.

7. A pneumatic vacuum gripping assembly according to claim 6, wherein said housing further comprises a fourth chamber to which fourth and fifth fluid communication ports are coupled and a third fluid communication passageway formed in said housing and extending from a first location of said fourth chamber to a third location of said third chamber whereat the fluid pressure sensor port of said sensor means is located, and a third movable valve element arranged to controllably restrict fluid flow between said fourth communication port and said fourth chamber.

8. A pneumatic vacuum gripping assembly according to claim 7, wherein said third movable valve element comprises a flexible diaphragm supported in said fourth chamber for effectively interrupting fluid communication between said fourth communication port and said fourth chamber in response to a prescribed pressure stimulus at said fourth communication port.

9. A pneumatic vacuum gripping assembly according to claim 8, wherein said housing further includes a fourth fluid communication passageway therethrough coupling said fifth communication port to a second location in said fourth chamber adjacent to the flexible diaphragm of which is third movable valve element is comprised, so that, in response to the application of a positive pressure stimulus to said fifth communication port, and thereby into said fourth chamber, said flexible diaphragm is displaced away from a fluid restricting condition of said fourth fluid communication port, so that said positive pressure stimulus is coupled from said fourth chamber to said fourth communication port.

10. A pneumatic vacuum gripping assembly according to claim 6, wherein said second movable valve element comprises a flexible diaphragm arranged in said second chamber between said first fluid communication passageway adjacent and third fluid communication port, so as to be flexibly translated toward said third fluid communication port and thereby restrict fluid communication through said third fluid communication port, in response to said controlled pressure being output from said sensor means through said first fluid communication passageway and into said second chamber.

11. An apparatus for controlling the operation of a pneumatic vacuum gripping system having a suction gripper device arranged for suction engagement with an object and being coupled by way of a fluid flow link to a venturi for controlling the vacuum of said suction gripper device comprising:
first means, coupled to said fluid flow link, for receiving a stimulus representative of the pressure in said fluid flow link and providing an output signal representative thereof, in response to which output signal fluid flow through said venturi and thereby the vacuum imparted from said venturi through said fluid flow link to said suction gripper device are controlled; and
second means, having a first port coupled to said fluid flow link, a second port coupled to said first means and a third port for receiving a controllable pressure, for causing a first negative pressure-representative stimulus to be coupled from said second port to said first means in response to a negative pressure in said fluid flow link associated with suction engagement of said suction gripper device with an object and for coupling a positive pressure-representative stimulus from said third port to said first and second ports and thereby to said fluid flow link and said first means, respectively, in response to the application of a positive pressure to said third port, thereby causing the output signal provided by said first means to reduce the fluid flow applied to said venturi and a release of the suction engagement of said suction gripper device with said object, and wherein said second means comprises a housing having a chamber to which said first, second and third ports are coupled, said chamber including a fluid flow valve for restricting fluid communication between said first and second ports in response to a negative pressure in said fluid flow link, and providing fluid communication among each of said first, second and third ports in response to the application of a positive pressure to said third port, and wherein said fluid flow valve comprises a valve base having an aperture therethrough in fluid communication with said first port, and a flexible diaphragm supported adjacent to said valve base so as to define, with a floor of said chamber, a chamber region to which said second and third ports are coupled and being arranged to restrict fluid flow through said aperture when flexed in response to a negative pressure in said fluid flow link, and thereby effectively restrict fluid communication between said first port and said chamber region.

12. An apparatus for controlling the operation of a pneumatic vacuum gripping system having a suction gripper device arranged for suction engagement with an object and being coupled by way of a fluid flow link to a venturi for controlling the vacuum of said suction gripper device comprising:
first means, coupled to said fluid flow link, for receiving a stimulus representative of the pressure in said fluid flow link and providing an output signal representative thereof, in response to which output signal fluid flow through said venturi and thereby the vacuum imparted from said venturi through said fluid flow link to said suction gripper device are controlled; and
second means, having a first port coupled to said fluid flow link, a second port coupled to said first means and a third port for receiving a controllable pressure, for causing a first negative pressure-representative stimulus to be coupled from said second port to said first means in response to a negative pressure in said fluid flow link associated with suction engagement of said suction gripper device with an object and for coupling a positive pressure-representative stimulus from said third port to said first and second ports and thereby to said fluid flow link and said first means, respectively, in response to the application of a positive pressure to said third port, thereby causing the output signal provided by said first means to reduce the fluid flow applied to said venturi and a release of the suction engagement of said suction gripper device with said object, further comprising a housing having first, second and third chambers, a fourth port, to which a main pneumatic supply for said venturi is applied, coupled to a first portion of said first chamber, a fifth port coupled to a second portion of said first chamber and to an inlet of said venturi is coupled, and a sixth port coupled between a third portion of said first chamber and a first portion of said second chamber, and wherein said first means comprises a first movable valve element disposed within said first chamber, between the first and second portions thereof and having a fluid passageway for providing a fluid communication path therethrough between said fourth port and said third portion of said first chamber, and being movable between first and second positions within said first chamber, such that, at its first position, said first movable valve element provides a fluid communication path between said first and second portions of said first chamber and thereby provides fluid communication between said fourth and fifth ports, so that pneumatic pressure from said main supply is coupled to the inlet port of said venturi, and at its second position, said first movable valve element interrupts the fluid communication path between said first and second portions of said first chamber and thereby prevents fluid communication between said fourth and fifth ports and thereby interrupts the application of pneumatic pressure from said main supply to said venturi, a second movable valve element supported within said second chamber for controllably restricting fluid flow through said sixth port, a first fluid communication passageway formed in said housing between said second chamber and a first location within said third chamber, and a second fluid communication passageway formed in said housing between said first portion of said first chamber and a second location within said third chamber, fluid-flow sensor means, provided in said third chamber, having a fluid pressure supply port coupled to said second fluid communication passageway at said second location within said third chamber, a fluid pressure output port coupled to said first fluid communication passageway at said first location within said third chamber, and a fluid pressure sensor port, corresponding to said second port, coupled via said second means to said fluid flow link from said venturi, said fluid flow sensor means providing, at said fluid pressure output port, a controlled pressure in response to a pressure stimulus at said fluid pressure sensor port, said controlled pressure being coupled through said first fluid pressure passageway to said second chamber to control the operation of said second moveable valve element and thereby fluid communication through said sixth port; whereby in response to a first pressure stimulus applied to said second port, a controlled pressure is coupled through said first fluid pressure passageway to said second chamber to cause said second valve element to restrict fluid communication through said sixth port and thereby cause said first movable valve element to be translated to said first position, so that a fluid flow communication path may be established between said fourth and fifth ports and, in response to a second pressure stimulus applied to said second port, said controlled pressure is reduced, so as to cause said second moveable valve element to allow fluid communication through said sixth port and thereby cause said first movable valve element to be translated to said second position, and interrupt a fluid flow communication path between said fourth and fifth communication ports.

13. An apparatus according to claim 12, where said housing further comprises a fourth chamber to which said first and third ports are coupled and a third fluid communication passageway formed in said housing and extending from a first location of said fourth chamber to a third location of said third chamber whereat the fluid pressure sensor port of said sensor means is located, and a third movable valve element arranged to controllably restrict fluid flow between said first port and said fourth chamber.

14. An apparatus according to claim 13, wherein said third movable valve element comprises a flexible diaphragm supported in said fourth chamber for effectively interrupting fluid communication between said first port and said fourth chamber in response to a prescribed pressure stimulus at said first port.

15. An apparatus according to claim 14, wherein said housing further includes a fourth fluid communication passageway therethrough coupling said third port to a second location in said fourth chamber adjacent to the flexible diaphragm therein, so that, in response to the application of a positive pressure stimulus to said third port, and thereby into said fourth chamber, said flexible diaphragm is displaced away from a fluid restricting condition of said first port, so that said positive pressure stimulus is coupled through said fourth chamber to said first port and thereby to said fluid flow link.

16. An apparatus according to claim 15, wherein said second movable valve element comprises a flexible diaphragm arranged in said second chamber between said first fluid communication passageway and said sixth port, so as to be flexibly translated toward said sixth port and thereby restrict fluid communication through said sixth port, in response to said controlled pressure output from said sensor means.

* * * * *